3,272,594
Patented Sept. 13, 1966

3,272,594
PREPARATION OF MAGNESIUM TRISILICATE
Yoshio Uyeda, San Mateo, Calif., assignor to Merck & Co., Inc., Rahway, N.J., a corporation of New Jersey
No Drawing. Continuation of application Ser. No. 152,077, Nov. 13, 1961. This application Oct. 22, 1965, Ser. No. 502,290
7 Claims. (Cl. 23—110)

This application is a continuation of application Serial No. 152,077 filed Nov. 13, 1961, now abandoned.

This invention relates to an improved process for preparing alkaline earth silicates. More particularly, it relates to an improved method for producing magnesium trisilicates which possess advantageous physical properties. Specifically, the invention relates to an improved method for producing magnesium trisilicates having good wetting properties and enhanced filtering and washing characteristics.

Magnesium trisilicates have been used for internal consumption as an effective antacid. In the utilization of the antacid property, i.e., in the preparation of tablets containing magnesium trisilicate, it is common to granulate the constituents prior to tableting. In the process of granulation it is customary to wet the ingredients so that effective granulation may take place. As a result, the granulated preparation contains relatively large amounts of water which must be removed before the material can be pressed into tablets. It would therefore, be desirable to have available a magnesium trisilicate which requires a lesser degree of wetting prior to granulation than the magnesium trisilicate currently available. It is one object of this invention to prepare such a magnesium trisilicate. Another object of the invention is to prepare a magnesium trisilicate which may be filtered and washed at increased bulk volumes and rates. These and other objects will become more apparent when consideration is given to the following detailed disclosure.

In accordance with the present invention, magnesium trisilicate having the probable formula $Mg_2Si_3O_8 \cdot 7H_2O$, and possessing improved characteristics, is prepared in a continuous process by reacting a soluble magnesium salt with silica in an aqueous alkaline medium, and maintaining the unreacted magnesium salt in slightly excess quantities in the mother liquors of the process. The magnesium salts which may be used are the water or base soluble salts of mineral acids such as magnesium sulfate, magnesium nitrate, magnesium chloride, magnesium bromide and other magnesium salts which are soluble in aqueous or alkaline media to an extent sufficient to provide a convenient concentration thereof, such as magnesium acetate, magnesium bromate, magnesium chlorate and the like. The silica may be used in the form of a solution thereof in a strong base such as sodium hydroxide, potassium hydroxide and the like.

In a preferred method of practicing the present invention, a silicate solution formed by dissolving silica in an aqueous alkaline medium is introduced continuously into a precipitating vessel. Fed concurrently therewith, is an aqueous solution of a magnesium salt. As the reactants are fed into the precipitating vessel, magnesium trisilicate precipitates, forming a slurry with the aqueous, alkaline mother liquors. The magnesium trisilicate is separated from the mother liquors, as by filtering, for example leaving a clear aqueous alkaline mother liquor solution. The success of the method of the present invention, that is, the preparation of magnesium trisilicate having improved wetting and filtering characteristics, is contingent upon maintaining a prescribed excess of the magnesium salt in these mother liquors. It has been discovered that the desired properties are obtained when the level of the magnesium salt in the mother liquors is maintained at not more than 0.04 and preferably between 0.0008–0.025 moles of the salt per liter of mother liquor solution.

The excess of the magnesium salt in the mother liquor solution may be maintained at a given level by adjusting the concentration of reactants in their respective solutions or by varying the feed rates of these solutions to the precipitating vessel, or by combinations of these variables. It will be apparent to those skilled in the art that conventional calculations may be employed, based on the stoichiometry of the reaction, to determine various concentrations and feed rates in order to maintain the magnesium salt at a given level in the mother liquors. Hence, the actual values for feed rates and concentration of individual reactant solutions are therefore interdependent and are not individually critical, save to the extent that the combination of these variables results in a mother liquor solution having a concentration of not more than 0.04 mole of excess magnesium salt per liter of solution. In general, the values ultimately selected will be determined by the economics of using for example, dilute solutions at high feed rates or concentrated solutions at lower feed rates.

With regard to the magnesium salt solution, concentrations as high as those provided by saturated solutions may be employed. It has been found convenient, however, to use a concentration of magnesium salt of from 0.5–4.0 moles per liter of aqueous solution, with optimum results being obtained when a value in the range of from 2.0–3.0 moles of magnesium salt per liter of aqueous solution is employed. Suitable feed rates for these concentrations range from 15–85 cc. per min. and preferably from 25–40 cc. per min. It will be understood, however, that these concentration and feed rate values are not critical and values outside the ranges indicated may be used where desired.

The concentration of the alkaline silicate solution reacted with the magnesium salt solution is conveniently from 0.75–6.0 moles of silica and preferably from 1.0–4.0 moles of silica per liter of solution. Suitable feed rates for these concentrations range from 20–125 cc. per min. and preferably 30–90 cc. per min. These values, however, are not critical and deviations from the ranges indicated may be made if desired, providing the excess of magnesium salt in the mother liquors is maintained at the level previously specified.

With further regard to the silica solution, it will be apparent to those skilled in the art that the silica is present therein as a complex between dissolved silica and an oxide of the cation of the particular base used. Therefore, the relative amounts of base and water used to prepare the silicate solution will in general determine the silica:oxide ratio of the complex. Since the process of the present invention is not dependent upon any particular silica:oxide ratio, the relative amounts of water and base are not critical. It is, of course, preferred to supply enough base to dissolve all of the silica used. Under certain circumstances a particular silica:oxide ratio may be desirable since this ratio affects the silica:magnesium oxide ratio of the magnesium trisilicate being produced. For example, where it is desired to produce a magnesium trisilicate which conforms to the U.S. Pharmacopeia requirements for internal consumption, that is, where the silica:magnesium oxide weight ratio is required to be between 2.1–2.3, it is necessary to use a silica:sodium oxide weight ratio in the silicate solution, of about 1.3–1.5.

With regard to the reaction conditions employed in carrying out the process of the present invention, it is convenient to use temperatures in the range of about 10° C. to 50° C., with room temperatures being suitable. The temperature is not critical, however, and other values may be used if desired. The reaction pressure is not critical, suitable results being obtained at atmospheric pressure.

Although the foregoing description is given with reference to introducing the reactants in the form of solution, the process of the present invention is not limited thereto. For example, the reactants in dry form may be introduced into an aqueous alkaline medium, therein to come in contact with each other in solution and react to produce magnesium trisilicate. Furthermore, a dry reactant may be introduced into a solution of the other reactant. The various methods and forms of introducing the reactants is immaterial provided that the level of excess magnesium salt in the mother liquors is maintained at the prescribed levels hereinabove set forth.

The magnesium trisilicate produced in accordance with the present invention exhibits enhanced physical properties which are a great advantage in the chemical process industry. For example, the product can be filtered and washed at much faster rates than the magnesium trisilicate produced according to conventional processes. In this regard, the magnesium trisilicate produced according to the present invention can be filtered at a rate of about 6000 lbs. per hour as opposed to a filtration rate of about 1000 lbs. per hour for conventionally produced magnesium trisilicate using the same filter. In addition, the product requires up to 30% less water to reach the same degree of wetness that the conventionally produced magnesium trisilicate requires. This is a distinct advantage in the tableting art.

The invention will now be described in terms of experimental data and specific examples, but it is understood that the scope of the invention is not to be limited thereto.

*Example I*

An aqueous solution of magnesium sulfate containing 283 g. of magnesium sulfate per liter of solution is fed continuously at room temperature and at a rate of 31 cc. per min. into a precipitating tank. Concurrently 72 cc. per min. of a sodium silicate solution (silica dissolved in sodium hydroxide solution) having a silicon dioxide:sodium oxide ratio of 1.5 and being present in said solution to the extent of 175 g. per liter of solution is fed into the same precipitating vessel. As magnesium trisilicate precipitates, the level of excess magnesium sulfate in the mother liquors is maintained at between 0.6 and 0.9 g. per liter of mother liquor solution. The slurry containing the precipitate is removed from the precipitating tank, filtered on a vacuum drum filter and washed. The filtration rate is 203 g. of magnesium trisilicate per min. per ft.$^2$ of filter area. The filter cake is then spray dried and tested for its wettability. The dried material requires 16–18.5 cc. of water per 20 g. of dried magnesium trisilicate.

When the above procedure is repeated using equivalent amounts of magnesium nitrate, magnesium chloride, magnesium bromide, magnesium acetate, magnesium chlorate or magnesium bromate in place of magnesium sulfate, similar results are obtained.

When the above procedure is repeated using an equivalent amount of potassium hydroxide solution in place of sodium hydroxide to dissolve the silica, similar results are obtained.

The wettability of the product is determined as the number of ccs. of water required to assimilate all of 20 g. of the dry product into discrete agglomerates or masses. A convenient method for the determination includes the dropwise addition of water to a 20 g. sample of dry magnesium trisilicate with constant stirring and blending of the dry material with the wetted material. The point at which the last bit of dry material is assimilated into lumps or masses is taken as the end point.

*Example II*

The procedure of Example I is followed with the exception that the concentration of the sodium silicate solution fed continuously to the reaction vessel is 525 g. of sodium silicate per liter of solution and is fed at a rate of 59 cc. of solution per min. The aqueous solution of magnesium sulfate is fed at the rate of 70 cc. per min. (the concentration thereof being 283 g. per liter of fed solution). The level of excess magnesium sulfate maintained in the mother liquor is between 1.2 and 3 g. magnesium sulfate per liter of mother liquors. The filtration rate is 212 g. of magnesium trisilicate per min. per ft.$^2$ of filter area. The wettability of the magnesium trisilicate after spray drying is between 16 and 18.5 cc. of water per 20 g. of dried magnesium trisilicate.

All changes and modifications as come within the scope of the present invention are intended to be encompassed within the appended claims.

What is claimed is:

1. The continuous method of producing magnesium trisilicate having enhanced physical charcteristics which comprises continuously and concurrently adding an aqueous alkali metal silicate solution and an aqeous solution of magnesium salt to a reaction vessel, said solutions being added at such rates as to form a precipitate of magnesium trisilicate and to constantly maintain in the mother liquors 0.0008–0.025 moles of said magnesium salt per liter of said mother liquors, withdrawing the precipitate and mother liquors from the reaction zone, and filtering the magnesium trisilicate product from the mother liquors.

2. The method according to claim 1 wherein the magnesium salt is selected from the group consisting of soluble magnesium salts of mineral acids, magnesium acetate, magnesium chlorate, and magnesium bromate.

3. The method according to claim 2 wherein the alkali metal is sodium.

4. The method according to claim 2 wherein the alkali metal is potassium.

5. The method according to claim 3 wherein the magnesium salt is magnesium sulfate.

6. The method according to claim 4 wherein the magnesium salt is magnesium sulfate.

7. The continuous method of producing magnesium trisilicate having enhanced physical characteristics which comprises continuously and concurrently adding a sodium silicate solution having a silica:sodium oxide weight ratio of between 1.3–1.5 and an aqueous solution of magnesium sulfate to a reaction vessel, said solutions being added at such rates as to form a precipitate of magnesium trisilicate and to constantly maintain in the mother liquors 0.0008–0.025 moles of magnesium sulfate per liter of said mother liquors, withdrawing the precipitate and mother liquors from the reaction zone, and filtering the magnesium trisilicate product from the mother liquors.

References Cited by the Examiner

UNITED STATES PATENTS

| | | | |
|---|---|---|---|
| 2,384,563 | 9/1945 | Roseman et al. | 23—110 |
| 2,393,625 | 1/1946 | Simons | 23—110 X |

OSCAR R. VERTIZ, *Primary Examiner.*

E. J. MEROS, *Examiner.*